UNITED STATES PATENT OFFICE.

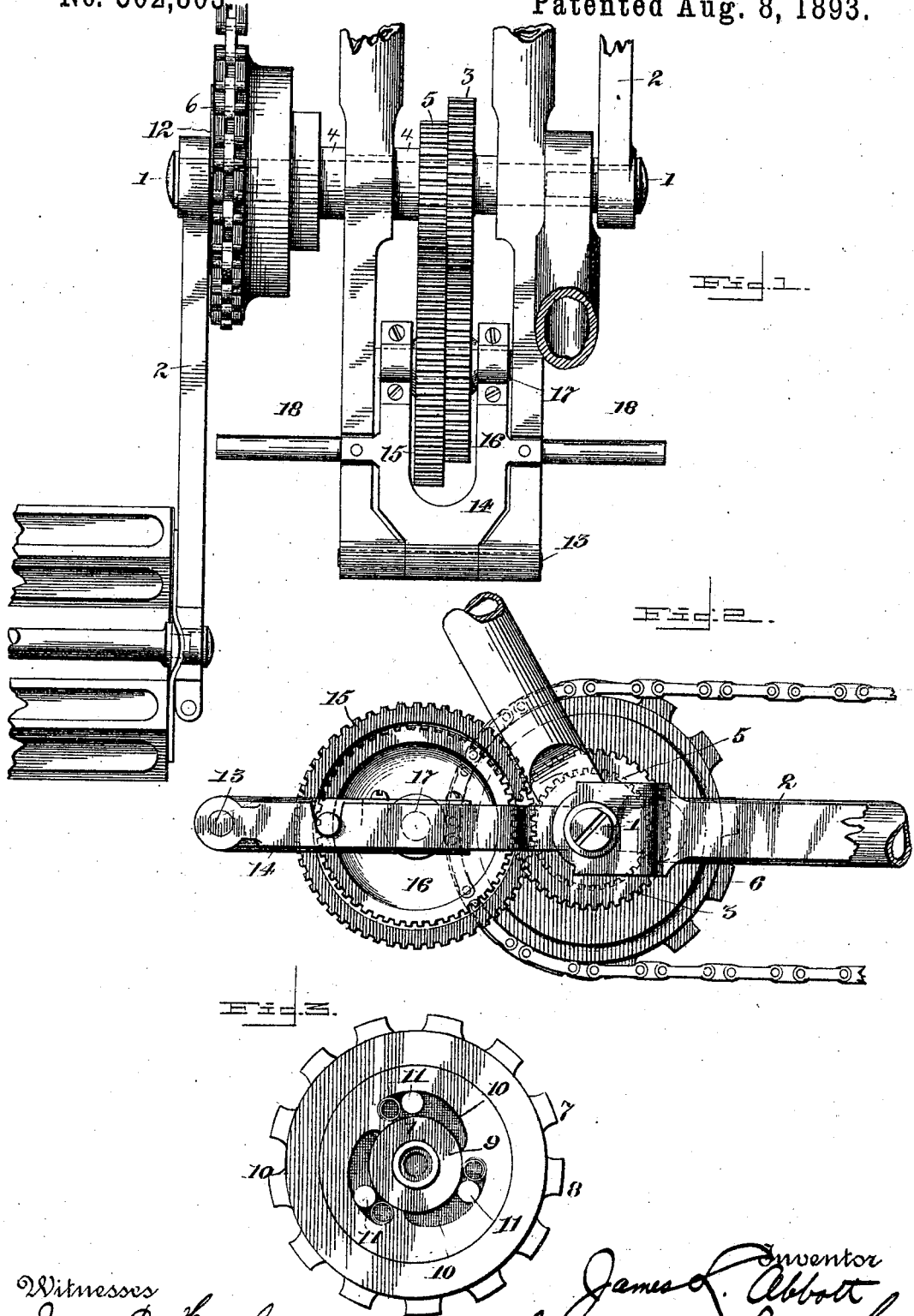

JAMES L. ABBOTT, OF FORT LEE, NEW JERSEY.

BICYCLE SPEED-GEARING.

SPECIFICATION forming part of Letters Patent No. 502,803, dated August 8, 1893.

Application filed December 4, 1891. Serial No. 414,026. (No model.)

*To all whom it may concern:*

Be it known that I, JAMES L. ABBOTT, a citizen of the United States, and a resident of Fort Lee, in the county of Bergen and State of New Jersey, have invented a certain new and useful Improvement in Bicycle Speed-Gearing, of which the following is a full, exact, and clear description.

My invention has relation to certain new and useful improvements in bicycle speed gearing, and my object is to provide a speed gear for safety machines that will be simple in operation, cheap to manufacture, and convenient in use.

In the accompanying drawings Figure 1 represents a plan view of my speed gearing Fig. 2, is a side elevation thereof. Fig. 3, is a side view of my sprocket wheel with its outer covering removed.

Mounted in suitable bearings in the frame of the bicycle is the sprocket wheel shaft 1, having pedals 2, secured to its extremities. Suitably secured to shaft 1, is a large gear wheel 3. Loosely mounted on the crank shaft or sprocket wheel shaft 1, is a sleeve 4, at one end of which sleeve is secured a small gear wheel 5, and at the opposite end of the said sleeve 4, I secure the sprocket wheel 6, from which the drive chain passes to the other sprocket wheel of the bicycle. The sprocket wheel 6, is recessed in one face as at 7, as shown in Fig. 3. To the sprocket wheel is secured a clutch wheel 8, such as I have shown seated in the recess 7, in the sprocket wheel and surrounding the shaft 1. The shaft 1, is preferably enlarged at this point by placing a collar 9, therein in order to afford a better gripping surface. The periphery of said clutch wheel is circular, but interiorly it is cut away to form pockets 10, each enlarged at one end and gradually tapering toward the other. In each of said pockets a ball or roller 11, is placed, each roller being upon the shaft 1, or collar 9, thereupon. By means of this clutch, when the sprocket wheel is turned in one direction it revolves freely upon the shaft, as the rollers in the pockets already mentioned rest in the large ends of said pockets. Backward movement of the clutch wheel, the sprocket wheel, its sleeve and attached gear is prevented by the rollers in the pockets getting into the smaller ends of said pockets when such movement is attempted. The recessed end of the sprocket wheel is preferably covered by a plate 12, and the inclined chamber thus formed may serve as a means for holding lubricant.

Suitably secured to any desired portion of the frame work of the machine, as at 13, is a hinged or pivoted arm 14, bifurcated at the end adjacent to shaft 1. In this bifurcated portion of the arm is a shaft upon which are mounted two gear wheels 15 and 16, fastened together. By moving the pivoted arm 14, upward to shaft 1, the gears mounted in said arm are brought into engagement with the gears 3 and 5, secured respectively to the shaft 1, and to the sleeve on said shaft, and it is by this means that variations are produced in the speed of the sprocket wheel, and as a consequence in that of the bicycle.

I preferably proportion the sizes of the gear wheels as follows: The wheel 3, has thirty-six teeth. The wheel 5, has twenty-four teeth, the wheel 15, has forty-eight teeth, and the wheel 16, has thirty-six teeth. These proportions may be greatly varied. It will therefore be apparent that as the gear 3, is fast to the shaft and always moves with it, and as the gear 5, is connected to the sprocket wheel and is free to revolve faster than the shaft it will be only necessary in order to make the sprocket to move faster than the shaft, to connect gear 3, with gear 5, by the other gears mentioned. As gear 3, on shaft 1, and gear 16, on the shaft 17, in the pivoted arm are of equal size, when gear 3, drives gear 16, shafts 1, and 17, will make the same number of revolutions, and as the shaft 17, carries the gear 15, which is twice as large as gear 5, with which it meshes, said latter gear 5, when turned by gear 15, will make twice as many revolutions as gear 15, does. Now as gear 5, is rigidly connected with the sprocket wheel, when gear 5, is revolving at double speed, the sprocket wheel also does and as of course do the bicycle wheels.

It is intended that the double or fast speed shall be the regular road speed. When, however, a hill is to be climbed it is only necessary to disconnect the gears carried by the bifurcated arm from the other gears whereby the movement is changed to the slow or single speed with the increased power.

In order to readily engage and disengage the gears any means may be employed by which the rider may operate the bifurcated arm by foot or hand without dismounting. In this case I show pieces 18, one projecting from each side of the arm 14, although even they may be dispensed with, and the arm 14, operated by the foot of the rider.

It is obvious that many modifications may be made without departing from the spirit of my invention.

Having thus fully described my invention, what I claim as new, and desire to secure by Letters Patent of the United States, is—

1. In a bicycle, a sprocket wheel and spur gear mounted to loosely rotate in one direction on the main shaft a clutch arranged to prevent rotation in the opposite direction, a spur gear of different size secured on said shaft, two differential spur gears mounted on a frame pivotally secured between the projecting ends of the fork and adapted to be engaged with or disengaged from said first mentioned spur gears, said frame having projecting studs or stops, substantially as and for the purpose described.

2. In a bicycle, the combination with the main shaft, of a sprocket wheel and spur gear secured on a loose sleeve on said shaft, a clutch located in a recess in the face of the sprocket wheel and normally arranged to run freely on the shaft in one direction and to grip it in the other, a larger spur gear secured on the said shaft, and two differential gears mounted in a swinging frame and adapted to engage with the spur gears on the main shaft, the larger of said differential gears meshing with the smaller gear on the sleeve, as and for the purpose specified.

3. In a bicycle speed varying mechanism comprising a sprocket wheel and a spur wheel carried by a sleeve, the latter being mounted loosely on the main shaft and the said sprocket wheel having a clutch arranged in a recess formed in the face thereof, a larger spur wheel being secured on the main shaft, a frame pivotally secured between the lower projecting ends of the fork and provided with lateral studs, said frame carrying differential gears, the smaller of which engages the large pinion on the main shaft and the larger engages the small pinion on the sleeve, substantially as specified.

4. In a bicycle, the combination with a main shaft 1, of the differential gears 3, 5 and sprocket wheel 6 mounted thereon, a clutch located in a recess formed in the said sprocket wheel, a pivotally secured frame 14 carrying differential gears 15, 16, engaging the said gears 3, 5, and the laterally projecting studs 18 of the frame 14 as specified.

5. In a bicycle, the combination with the main shaft 1, of the recessed driving wheel 6 secured on one end of a loosely mounted sleeve 4 the clutch 8, 9, 10 and 11 located in said recess 7, a gear 5 secured on the opposite end of said sleeve, a second gear 3, mounted adjacent to the latter to revolve with the said shaft 1, the swinging frame 14 carrying the differential gears 15, 16, the said frame being pivoted between the projecting ends of the forks and the laterally extending studs 18, whereby the said gears carried by the frame 14 may be thrown into or out of engagement with the gears 3, 5, as specified.

In testimony whereof I hereunto affix my signature in the presence of two witnesses.

JAMES L. ABBOTT.

Witnesses:
  CHAS. M. NORMAN,
  JAMES ABBOTT.